US008601496B2

(12) United States Patent
Aloni et al.

(10) Patent No.: US 8,601,496 B2
(45) Date of Patent: Dec. 3, 2013

(54) METHOD AND SYSTEM FOR PROTOCOL OFFLOAD IN PARAVIRTUALIZED SYSTEMS

(75) Inventors: Eliezer Aloni, Zur Yigal (IL); Rafi Shalom, Givat Shmuel (IL)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/523,088

(22) Filed: Jun. 14, 2012

(65) Prior Publication Data

US 2012/0254896 A1 Oct. 4, 2012

Related U.S. Application Data

(63) Continuation of application No. 13/084,688, filed on Apr. 12, 2011, now Pat. No. 8,225,332, which is a continuation of application No. 11/946,764, filed on Nov. 28, 2007, now Pat. No. 7,926,067.

(60) Provisional application No. 60/867,485, filed on Nov. 28, 2006.

(51) Int. Cl.
*G06F 13/00* (2006.01)

(52) U.S. Cl.
USPC ........... 719/319; 719/321; 719/324; 719/327; 719/328

(58) Field of Classification Search
USPC .................. 719/319, 321, 324, 327, 328
See application file for complete search history.

(56) References Cited

U.S. PATENT DOCUMENTS

| 6,530,061 | B1* | 3/2003 | Labatte ................. 714/807 |
| 7,620,955 | B1* | 11/2009 | Nelson ................. 719/312 |
| 7,926,067 | B2 | 4/2011 | Aloni et al. |
| 2005/0135415 | A1 | 6/2005 | Fan et al. |
| 2008/0127227 | A1 | 5/2008 | Aloni et al. |
| 2008/0144635 | A1 | 6/2008 | Carollo et al. |
| 2009/0183180 | A1 | 7/2009 | Nelson |
| 2010/0070677 | A1 | 3/2010 | Thakkar |
| 2010/0299459 | A1 | 11/2010 | Tripathi et al. |
| 2011/0191436 | A1 | 8/2011 | Aloni et al. |

* cited by examiner

*Primary Examiner* — Andy Ho
(74) *Attorney, Agent, or Firm* — Thomas | Horstemeyer, LLP

(57) ABSTRACT

Certain aspects of a method and system for protocol offload in paravirtualized systems may be disclosed. Exemplary aspects of the method may include preposting of application buffers to a front-end driver rather than to a NIC in a paravirtualized system. The NIC may be enabled to place the received offloaded data packets into a received data buffer corresponding to a particular guest operating system (GOS). A back-end driver may be enabled to acknowledge the placed offloaded data packets. The back-end driver may be enabled to forward the received data buffer corresponding to the particular GOS to the front-end driver. The front-end driver may be enabled to copy offloaded data packets from a received data buffer corresponding to a particular GOS to the preposted application buffers.

20 Claims, 5 Drawing Sheets

METHOD AND SYSTEM FOR PROTOCOL OFFLOAD IN PARAVIRTUALIZED SYSTEMS

CROSS-REFERENCE TO RELATED APPLICATIONS/INCORPORATION BY REFERENCE

This application is a continuation of U.S. patent application Ser. No. 13/084,688, filed Apr. 12, 2011 and issued as U.S. Pat. No. 8,225,332, which is a continuation of U.S. patent application Ser. No. 11/946,764, filed Nov. 28, 2007 and issued as U.S. Pat. No. 7,926,067, which claims the benefit of U.S. Provisional Application Ser. No. 60/867,485, filed Nov. 28, 2006.

Each of the above stated applications is hereby incorporated herein by reference in its entirety.

RELATED FIELD

Certain embodiments of the present disclosure relate to network interfaces. More specifically, certain embodiments relate to a method and system for protocol offload in paravirtualized systems.

BACKGROUND

In networking systems, a single server may be utilized to concurrently support multiple server operations or services. For example, a single server may be utilized for providing access to business applications while also operating as an email server, a database server, and/or an exchange server. The server may generally support the various server operations by utilizing a single operating system (OS). The server operations, via the single OS, make use of server processing resources such as the central processing unit (CPU), memory, network interface card (NIC), peripheral sound card, and/or graphics card, for example. In many instances, the server resources may not be efficiently utilized because the demand for server operations generally vary based on the type of service provided and/or user needs. Consolidating server services into a single operation may result in an improvement in server efficiency. However, consolidation also removes the level of protection that is provided when the operations are maintained separate. For example, when the operations are consolidated, a crash or failure in a database server may also result in the loss of email services, exchange services, and/or application services.

Another approach for improving server efficiency may be to utilize multiple operating systems running concurrently so that each operating system supports a different server operation, for example. The multiple operating systems may be referred to as guest operating systems (GOSs). This approach maintains the level of protection provided when server operations are not consolidated while also enabling the optimization of the usage of the processing resources available to the server. The use of multiple guest operating systems may be referred to as OS virtualization because each GOS perceives to have full access to the server's hardware resources. In this regard, a GOS may be unaware of the presence of any other GOS running on the server. In order to implement OS virtualization, a software layer may be needed to arbitrate access to the server's hardware resources. This software layer may be referred to as a hypervisor or virtual machine (VM) monitor, for example. The hypervisor may enable the multiple GOSs to access the hardware resources in a time-sharing manner.

A hardware resource that may be frequently utilized by at least one of the server operations or services is the NIC. In this regard, a hypervisor or VM monitor may enable creating a software representation of NIC that may be utilized by a GOS. This software representation of the NIC may be referred to as a "virtual NIC." However, a virtual NIC may be limited as to the kind of features or functionalities of the NIC that may be provided to the GOSs. For example, a virtual NIC may not be able to support transmission control protocol (TCP) offload functions. Offloading at least part of the TCP processing from the CPU to a processor on the NIC may provide improved network throughput. Without offloading capabilities, the data rate of the server may be limited in some circumstances. Another limiting aspect may be that a virtual NIC may only provide basic layer 2 (L2) networking functionality to the multiple GOSs. The virtual NIC may be limited to providing data communication between the GOSs and the network. In this regard, the virtual NIC may not be able to support other advanced features such as remote direct memory access (RDMA) and/or Internet small computers system interface (iSCSI), for example.

In addition to the limitations on the kind of features that may be provided by the virtual NIC, the hypervisor may also be required to do a significant amount of work when managing the interaction between the multiple GOSs and the server's hardware resources. Utilizing a hypervisor layer may introduce an overhead penalty to basic L2 networking operations that may not be present when a single OS is utilized. For example, when data is to be transmitted from any of the GOSs, the hypervisor may be required to arbitrate access to the NIC. When data is received by the NIC, the hypervisor may be required to determine which one is the appropriate GOS to send the received data. Moreover, because each GOS and the hypervisor may utilize different portions of memory, the hypervisor may have the added responsibility of managing the transfer of data from one portion of memory to another.

Due to the growing demand to support multiple GOSs in a single server, new solutions may require that the overhead introduced by the presence of a hypervisor layer be reduced and/or that advance features may be supported by the virtualization of a portion of the server's hardware resources such as the network interface card.

The TCP/IP protocol has long been the common language for network traffic. However, processing TCP/IP traffic may require significant server resources. Specialized software and integrated hardware known as TCP offload engine (TOE) technology may eliminate server-processing constraints. The TOE technology may comprise software extensions to existing TCP/IP stacks that may enable the use of hardware data planes implemented on specialized TOE network interface cards (TNIC). This hardware and/or software combination may allow operating systems to offload all TCP/IP traffic to the specialized hardware on the TNIC, leaving TCP/IP control decisions on the server. Most operating system vendors prefer this approach, which is based on a data-path offload architecture.

Para-virtualization is a virtualization technique that may present a software interface to virtual machines that may be similar but not identical to that of the underlying hardware. Para-virtualization may allow the virtual machine monitor (VMM) to be simpler or virtual machines that run on it to achieve performance closer to non-virtualized hardware. However, operating systems may have to be explicitly ported to run on top of a paravirtualized VMM. Paravirtualization may modify the OS running inside the VM to run under the hypervisor. The OS may be modified to support the hypervisor and avoid unnecessary use of privileged instructions. These modifications may allow the performance of the system to be near native.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY

A method and/or system for protocol offload in paravirtualized systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION

Certain embodiments of the invention may be found in a method and system for protocol offload in paravirtualized systems. Aspects of the method and system may comprise preposting of application buffers to a front-end driver rather than to a NIC in a paravirtualized system. The NIC may be enabled to place the received offloaded data packets into a received data buffer corresponding to a particular GOS. A back-end driver may be enabled to acknowledge the placed offloaded data packets. The back-end driver may be enabled to forward the received data buffer corresponding to the particular GOS to the front-end driver. The front-end driver may be enabled to copy offloaded data packets from a received data buffer corresponding to a particular guest operating system (GOS) to the preposted application buffers.

Figure 1A:
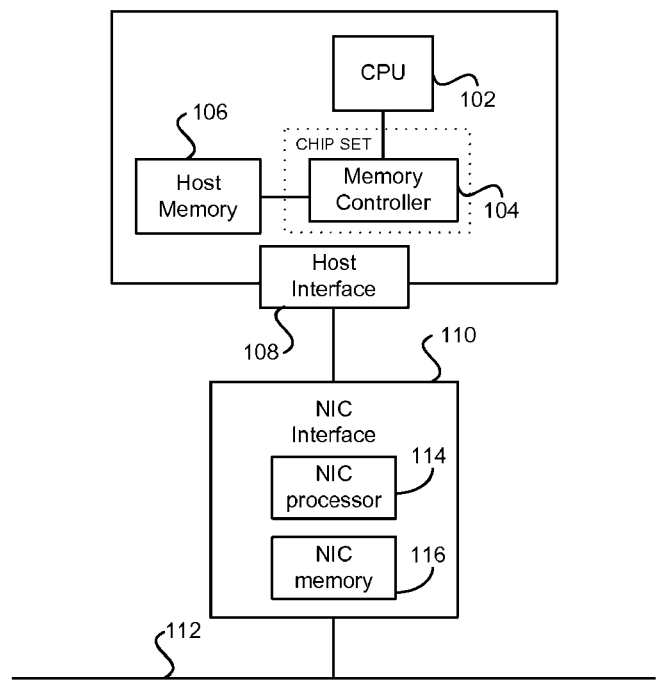
FIG. 1A is a block diagram of an exemplary system with a NIC interface, in accordance with an embodiment of the invention.

FIG. 1A is a block diagram of an exemplary system with a NIC interface, in accordance with an embodiment of the invention. Referring to FIG. 1A, the system may comprise, for example, a CPU 102, a memory controller 104, a host memory 106, a host interface 108, NIC interface 110 and an Ethernet bus 112. The NIC interface 110 may comprise a NIC processor 114 and NIC memory 116. The host interface 108 may be, for example, a peripheral component interconnect (PCI), PCI-X, PCI-Express, ISA, SCSI or other type of bus.

The memory controller 106 may be coupled to the CPU 104, to the memory 106 and to the host interface 108. The host interface 108 may be coupled to the NIC interface 110. The NIC interface 110 may communicate with an external network via a wired and/or a wireless connection, for example. The wireless connection may be a wireless local area network (WLAN) connection as supported by the IEEE 802.11 standards, for example.

Figure 1B:
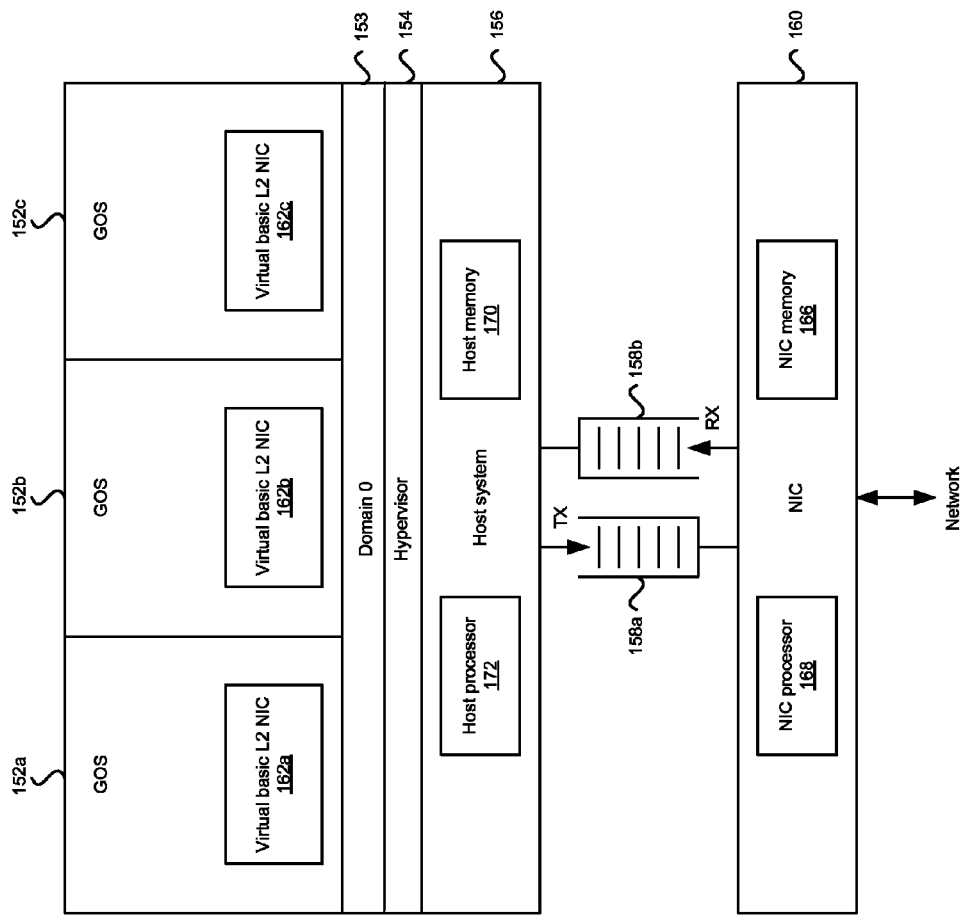
FIG. 1B is a block diagram of a NIC communicatively coupled a host system that supports a plurality of guest operating systems (GOSs), in accordance with an embodiment of the invention.

FIG. 1B is a block diagram of a NIC communicatively coupled a host system that supports a plurality of guest operating systems (GOSs), in accordance with an embodiment of the invention. Referring to FIG. 1B, there is shown a first GOS 152a, a second GOS 152b, a third GOS 152c, a domain 0 153, a hypervisor 154, a host system 156, a transmit (TX) queue 158a, a receive (RX) queue 158b, and a NIC 160. The NIC 160 may comprise a NIC processor 168 and a NIC memory 166. The host system 156 may comprise a host processor 172 and a host memory 170.

The host system 156 may comprise suitable logic, circuitry, and/or code that may enable data processing and/or networking operations, for example. In some instances, the host system 156 may also comprise other hardware resources such as a graphics card and/or a peripheral sound card, for example. The host system 156 may support the operation of the first GOS 152a, the second GOS 152b, and the third GOS 152c via the hypervisor 154. The number of GOSs that may be supported by the host system 156 by utilizing the hypervisor 154 need not be limited to the exemplary embodiment described in FIG. 1B. For example, two or more GOSs may be supported by the host system 156.

The hypervisor 154 may operate as a software layer that may enable OS virtualization of hardware resources in the host system 156 and/or virtualization of hardware resources communicatively coupled to the host system 156, such as the NIC 160, for example. The hypervisor 154 may also enable data communication between the GOSs and hardware resources in the host system 156 and/or hardware resources communicatively connected to the host system 156. For example, the hypervisor 154 may enable packet communication between GOSs supported by the host system 156 and the NIC 160 via the TX queue 158a and/or the RX queue 158b.

The host processor 172 may comprise suitable logic, circuitry, and/or code that may enable control and/or management of the data processing and/or networking operations associated with the host system 156. The host memory 170 may comprise suitable logic, circuitry, and/or code that may enable storage of data utilized by the host system 156. The hypervisor 154 may be enabled to control the pages that may be accessed by each GOS. The hypervisor 154 may be enabled to support GOS creation of per-process virtual memory maps. The hypervisor 154 may enable inter-partition communication by copying data from between partitions and/ or mapping certain pages for access by both a producer and a consumer partition.

The host memory 170 may be partitioned into a plurality of memory regions or portions. For example, each GOS supported by the host system 156 may have a corresponding memory portion in the host memory 170. Moreover, the hypervisor 154 may have a corresponding memory portion in the host memory 170. In this regard, the hypervisor 154 may enable data communication between GOSs by controlling the transfer of data from a portion of the memory 170 that corresponds to one GOS to another portion of the memory 170 that corresponds to another GOS.

The NIC 160 may comprise suitable logic, circuitry, and/or code that may enable communication of data with a network. The NIC 160 may enable level 2 (L2) switching operations, for example. A stateful network interface, for example, routers may need to maintain per flow state. The TX queue 158a may comprise suitable logic, circuitry, and/or code that may enable posting of data for transmission via the NIC 160. The RX queue 158b may comprise suitable logic, circuitry, and/or code that may enable posting of data or work requests received via the NIC 160 for processing by the host system 156. In this regard, the NIC 160 may post data or work requests received from the network in the RX queue 158b and may retrieve data posted by the host system 156 in the TX queue 158a for transmission to the network. The TX queue 158a and the RX queue 158b may be integrated into the NIC 160, for example. The NIC processor 168 may comprise suitable logic, circuitry, and/or code that may enable control and/or management of the data processing and/or networking operations in the NIC 160. The NIC memory 166 may comprise suitable logic, circuitry, and/or code that may enable storage of data utilized by the NIC 160.

The domain 0 153 may be a host domain that may host other GOSs, for example, GOS 152a, GOS 152b, and GOS 152c. Domain 0 may have direct access to the hardware devices, and it may utilize the device drivers. The first GOS 152a, the second GOS 152b, and the third GOS 152c may each correspond to an operating system that may enable the running or execution of operations or services such as applications, email server operations, database server operations, and/or exchange server operations, for example. The first GOS 152a may comprise a virtual NIC 162a, the second GOS 152b may comprise a virtual NIC 162b, and the third GOS 152c may comprise a virtual NIC 162c. The virtual NIC 162a, the virtual NIC 162b, and the virtual NIC 162c may correspond to software representations of the NIC 160 resources, for example. In this regard, the NIC 160 resources may comprise the TX queue 158a and the RX queue 158b. Virtualization of the NIC 160 resources via the virtual NIC 162a, the virtual NIC 162b, and the virtual NIC 162c may enable the hypervisor 154 to provide L2 switching support provided by the NIC 160 to the first GOS 152a, the second GOS 152b, and the third GOS 152c.

When receiving packets from the network via the NIC 160, the hypervisor 154 may determine packet information, for example, the media access control (MAC) address associated with the packet in order to transfer the received packet to the appropriate GOS. In this regard, the hypervisor 154 may receive the packets from the RX queue 158b and may demultiplex the packets for transfer to the appropriate GOS. After a determination of the particular packet information, for example, MAC address and appropriate GOS for a received packet, the hypervisor 154 may transfer the received packet from a buffer in the hypervisor controlled portion of the host memory 170 to a buffer in the portion of the host memory 170 that corresponds to each of the appropriate GOSs. The received packet may be copied from a back-end driver to a shared memory buffer. The data may be copied from GOS buffers to application buffers.

When connections are offloaded, it may be possible to post application buffers to the NIC 160 such that the NIC 160 may be enabled to place incoming data from a network directly into GOS buffers eliminating a need to further copy the data. However, in virtualized systems, posting of an application buffer between one of the GOSs to Domain 0 (Dom 0) may require extra overhead as the application buffer has to be mapped to Dom 0. As a result, the pre posting of buffers to NIC 160 may be non-efficient.

When application buffers are posted to NIC 160, they may arrive at NIC 160 after the data to be placed into the buffer has arrived. In such a case, the NIC 160 may prefer to place the incoming data into another buffer and later copy it to the posted application buffers after the application buffers are posted to the NIC 160. In this case, the pre-posted buffers may not be utilized to copy data to the application buffer. In virtualized systems, the increased latency in posting the buffers may decrease the probability of succeeding in placing data directly to application buffers.

The cycle of indicating data to an application and waiting for an application to post application buffers before indicating further data may limit the throughput of the system because of a single I/O delivered. The latency associated with virtualization may be reduced due to a need to switch from Dom 0 to GOS and back to Dom 0. In accordance with an embodiment of the invention, not posting the application buffers to the NIC 160 may be more efficient. The interface between the operating system and the front-end driver in the GOS may not be changed. Similarly, the interface between the back-end driver and the device driver in Dom 0 may not be altered.

Figure 2:
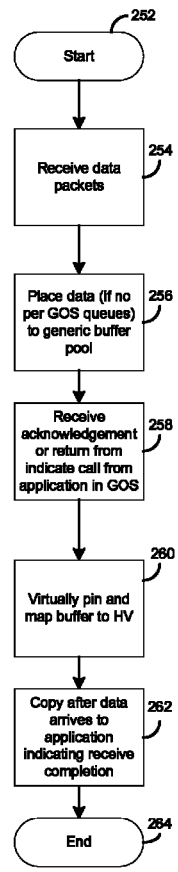
FIG. 2 is a flowchart illustrating exemplary steps for transferring zero copy application programming interface (API) over a shared memory interface between a guest operating system (GOS) and hypervisor, in accordance with an embodiment of the invention.

FIG. 2 is a flowchart illustrating exemplary steps for transferring zero copy application programming interface (API) over a shared memory interface between a guest operating system (GOS) and hypervisor, in accordance with an embodiment of the invention. Referring to FIG. 2, exemplary steps may begin at step 252. In step 254, the NIC 160 may receive data packets. In step 256, the NIC 160 may enable placing the received offloaded data packet to a generic buffer pool, if no per GOS queues are available. In step 258, the NIC driver in HV 154 may receive an acknowledgement from the application in GOS 152a. The application in GOS 152a may be enabled to post the application buffer to the GOS. In step 260, the GOS 152a may be enabled to virtually pin the buffer and map the buffer to HV 154. The GOS 152a may post a pointer to the buffer over a shared memory interface. In step 262, the data packet may be copied to an application buffer in back-end driver. The throughput may be limited to one I/O per roundtrip between HV 154 and GOS 152a. Control then passes to end step 266.

Figure 3A:
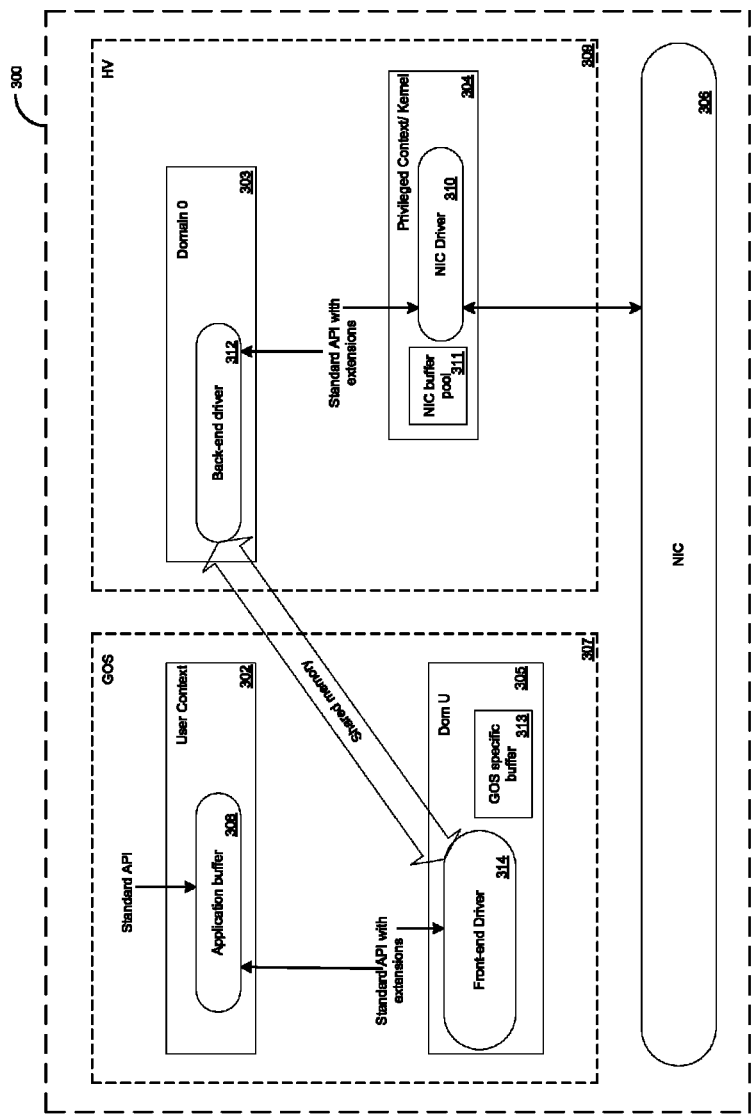
FIG. 3A is a block diagram illustrating protocol offload in a paravirtualized system, in accordance with an embodiment of the invention.

FIG. 3A is a block diagram illustrating protocol offload in a paravirtualized system, in accordance with an embodiment of the invention. Referring to FIG. 3A, there is shown a paravirtualized system 300. The paravirtualized system 300 may comprise a GOS 307, a hypervisor (HV) 309, and a NIC 306. The GOS 307 may comprise a user context block 302, and a unprivileged domain (Dom U) 305. The HV 309 may comprise a domain 0 303, and a privileged context/kernel block 304. The user context block 302 may comprise a user buffer 308. The Dom U 305 may comprise a front-end driver 314. The domain 0 303 may comprise a back-end driver 312. The privileged context/kernel block 304 may comprise a NIC driver 310.

The NIC driver 310 may be coupled to the NIC 306. The front-end driver 314 may be paravirtualized to relay information to the back-end driver 312. The front-end driver 314 may be placed on a network's front-end or the network traffic may pass through the front-end driver 314. The back-end driver 312 may be located in the network's back-end. The back-end driver 312 may function in a plurality of environments, for example, virtual machine (VM) 0, or driver VM, for example. The back-end driver 312 may be enabled to invoke the NIC driver 310. The back-end driver 313 may be coupled to the front-end driver 314 via a shared memory interface.

In the paravirtualized system 300, the domain 0 303 may be a host domain that may host other GOSs. Domain 0 303 may have direct access to the hardware devices, and it may utilize the device drivers. Domain 0 may have another back-end layer that may comprise the back-end driver 312. The unprivileged domain (Dom U) 305 may have access to a front-end layer, which comprises the front-end driver 314. The Dom U 305 may issue I/O requests to the front-end similar to the I/O requests that are transmitted to a kernel. However, because the front-end is a virtual interface with no access to real hardware, these requests may be delegated to the back-end. The requests may then be sent to the physical devices. When Dom U 305 is created, it may create an interdomain event channel between itself and domain 0 303. The event channel may be a lightweight channel for passing notifications, such as indicating when an I/O operation has completed. A shared memory interface may exist between each guest domain or GOS and domain 0 303. This shared memory interface may be utilized to pass requests and data. The shared memory interface may be created and handled using the API.

The NIC 306 may be enabled to allocate one or more memory buffers, for example, GOS specific buffer 313 for each of the particular guest operating systems (GOSs), for example, GOS 307 in the paravirtualized system 300. The NIC 306 may be enabled to post the allocated one or more memory buffers, for example, GOS specific buffer 313 for each of the particular GOSs, for example, GOS 307 to a receive queue 158b.

The NIC 306 may be enabled to receive offloaded data packets associated with a particular network connection, for example, TCP/IP connection or iSCSI connection in a paravirtualized system 300. The NIC 306 may be enabled to determine whether one or more of the received offloaded data packets is associated with the particular network connection, for example, TCP/IP connection, RDMA connection or iSCSI connection based on one or more network connection parameters, for example, MAC address associated with the received offloaded data packets.

The NIC 306 may be enabled to place the received offloaded data packets into one or more memory buffers, for example, GOS specific buffer 313 corresponding to a particular guest operating system (GOS) 307 utilizing direct memory access (DMA). The NIC 306 may be enabled to place the received offloaded data packets into one or more memory buffers, for example, GOS specific buffer 313 corresponding to the particular GOS 307 based on the one or more network connection parameters, for example, MAC address associated with the offloaded received offloaded data packets. The network connection parameters may comprise a GOS identification parameter to identify the particular GOS, for example, GOS 307.

The back-end driver 312 may be enabled to acknowledge the placement of the received offloaded data packets or return the indicate call communicated by NIC 306. The back-end driver 312 may be enabled to forward the memory buffer or the return from the indicate call communicated by NIC 306 to a front-end driver 314. The front-end driver 314 may be enabled to hold the application buffer 308 without posting the application buffer 308 to the back-end driver 312. The front-end driver 314 may be enabled to copy the received offloaded data packets from shared NIC memory buffer pool 311 in to one or more memory buffers, for example, GOS specific buffer 313 corresponding to the particular GOS 307. The back-end driver 312 may be enabled to limit a number of offloaded network connections, for example, TCP/IP network connections or iSCSI network connections that may be offloaded based on one or more network connection parameters associated with the received offloaded data packets.

The GOS 307 may be enabled to prepost one or more application buffers, for example, application buffer 308 to a front-end driver 314 rather than to a NIC 306. The front-end driver 314 may be enabled to copy offloaded data packets from a received data buffer, for example, GOS specific buffer 313 to the preposted application buffers, for example, application buffer 308. The received data buffer, for example, GOS specific buffer 313 may correspond to a particular guest operating system (GOS) 307.

The NIC 306 may be enabled to receive the offloaded data packets from a network, for example, an Ethernet network. The NIC 306 may be enabled to place the received offloaded data packets into the received data buffer, for example, GOS specific buffer 313 corresponding to the particular GOS 307 utilizing direct memory access. The back-end driver 312 may be enabled to acknowledge the placed offloaded data packets. The front-end driver 314 may be enabled to hold the preposted application buffers, for example, application buffer 308 without posting the preposted application buffers, for example, application buffer 308 to the back-end driver 312.

The back-end driver 312 may be enabled to limit a number of offloaded network connections based on one or more network connection policies, for example, MAC address associated with the placed offloaded data packets. The offloaded network connections may be, for example, one of a TCP/IP connection, RDMA connection and/or an iSCSI connection. The back-end driver 312 may be enabled to forward the received data buffer, for example, GOS specific buffer 313 corresponding to the particular GOS 307 to the front-end driver 314. The NIC 306 may be enabled to place the received offloaded data packets into the received data buffer, for example, GOS specific buffer 313 corresponding to the particular GOS 307 based on one or more network connection parameters, for example, MAC address, or LAN ID associated with the offloaded data packets. The network connection parameters may comprise a GOS identification parameter to identify the particular GOS 307. The APIs between a device driver, for example, NIC driver 310 corresponding to NIC 306 and the back-end driver 312 may be preserved. The APIs between the particular GOS 307 and the front-end driver 314 may be preserved.

Figure 3B:
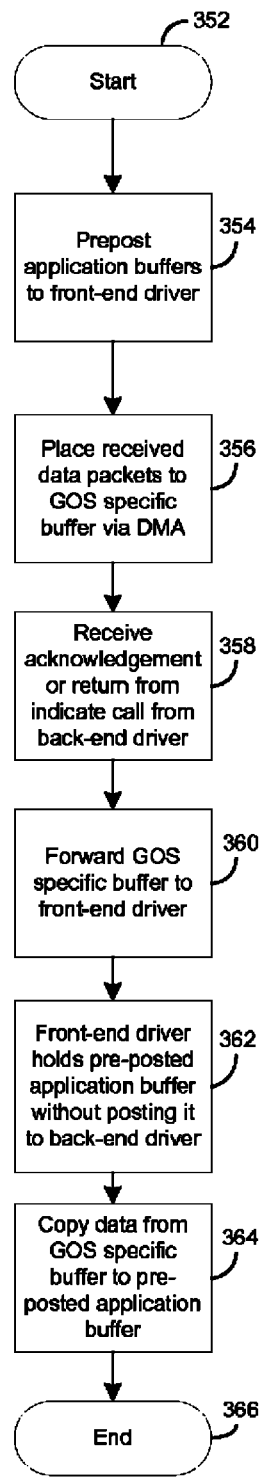
FIG. 3B is a flowchart illustrating exemplary steps for protocol offload in a paravirtualized system, in accordance with an embodiment of the invention.

FIG. 3B is a flowchart illustrating exemplary steps for protocol offload in a paravirtualized system, in accordance with an embodiment of the invention. Referring to FIG. 3B, exemplary steps may begin at step 352. In step 354, application buffer 308 may be pre-posted to the front-end driver 314. In step 356, the NIC 306 may enable placing the received offloaded data packet to a GOS specific buffer 313 in GOS 307 via DMA. In step 358, the back-end driver 312 may be enabled to acknowledge the placement of the received offloaded data packets or return the indicate call communicated by NIC 306. In step 360, the back-end driver 312 may be enabled to forward the GOS specific buffer 313 to the front-end driver 314. In step 362, the front-end driver 314 may be enabled to hold the pre-posted application buffer 308 without posting the application buffer 308 to the back-end driver 312. In step 364, the front-end driver 314 may be enabled to copy the received offloaded data packets from GOS specific buffer 313 to pre-posted application buffer 308. The throughput may not be limited by roundtrip between HV 309 and GOS 307. Control then passes to end step 366.

In accordance with an embodiment of the invention, a method and system for protocol offload in paravirtualized systems may comprise a NIC 306 that enables receipt of data packets associated with a particular network connection, for example, TCP/IP connection or iSCSI connection in a paravirtualized system 300. The NIC 306 may be enabled to place the received offloaded data packets into one or more memory buffers, for example, GOS specific buffer 313 corresponding to a particular guest operating system (GOS) 307 utilizing direct memory access (DMA). The NIC 306 may be enabled to allocate one or more memory buffers, for example, GOS specific buffer 313 for each of the particular guest operating systems (GOSs), for example, GOS 307 in the paravirtualized system 300. The NIC 306 may be enabled to post the allocated one or more memory buffers, for example, GOS specific buffer 313 for each of the particular GOSs, for example, GOS 307 to a receive queue 158b. The NIC 306 may be enabled to place the received offloaded data packets into one or more memory buffers, for example, GOS specific buffer 313 corresponding to the particular GOS 307 based on the one or more network connection parameters, for example, MAC address associated with the received offloaded data packets. The network connection parameters may comprise a GOS identification parameter to identify the particular GOS 307.

The back-end driver 312 may be enabled to acknowledge the placement of the received offloaded data packets or return the indicate call communicated by NIC 306. The back-end driver 312 may be enabled to forward the memory buffer, for example, GOS specific buffer 313 or the return from the indicate call communicated by NIC 306 to a front-end driver 314. The front-end driver 314 may be enabled to hold the application buffer 308 without posting the application buffer 308 to the back-end driver 312. The front-end driver 314 may be enabled to copy the received offloaded data packets from GOS specific buffer 313 to application buffer 308.

In accordance with an embodiment of the invention, a method and system for protocol offload in paravirtualized systems may comprise a GOS 307 that enables preposting of application buffers, for example, application buffer 308 to a front-end driver 314 rather than to a NIC 306. The front-end driver 314 may be enabled to copy offloaded data packets from a received data buffer, for example, GOS specific buffer 313 to the preposted application buffers, for example, application buffer 308. The received data buffer, for example, GOS specific buffer 313 may correspond to a particular guest operating system (GOS) 307.

The NIC 306 may be enabled to receive the offloaded data packets from a network, for example, an Ethernet network. The NIC 306 may be enabled to place the received offloaded data packets into the received data buffer, for example, GOS specific buffer 313 corresponding to the particular GOS 307 utilizing direct memory access. The back-end driver 312 may be enabled to acknowledge the placed offloaded data packets. The front-end driver 314 may be enabled to hold the preposted application buffers, for example, application buffer 308 without posting the preposted application buffers, for example, application buffer 308 to the back-end driver 312.

The back-end driver 312 may be enabled to limit a number of offloaded network connections based on one or more network connection policies, for example, MAC address associated with the placed offloaded data packets. The offloaded network connections may be, for example, one of a TCP/IP connection, RDMA connection and/or an iSCSI connection. The back-end driver 312 may be enabled to forward the received data buffer, for example, GOS specific buffer 313 corresponding to the particular GOS 307 to the front-end driver 314. The NIC 306 may be enabled to place the received offloaded data packets into the received data buffer, for example, GOS specific buffer 313 corresponding to the particular GOS 307 based on one or more network connection parameters, for example, MAC address, or LAN ID associated with the offloaded data packets. The network connection parameters may comprise a GOS identification parameter to identify the particular GOS 307. The APIs between a device driver, for example, NIC driver 310 corresponding to NIC 306 and the back-end driver 312 may be preserved. The APIs between the particular GOS 307 and the front-end driver 314 may be preserved.

Another embodiment of the invention may provide a machine-readable storage, having stored thereon, a computer program having at least one code section executable by a machine, thereby causing the machine to perform the steps as described herein for protocol offload in paravirtualized systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for processing data, the system comprising:
   a guest operation system (GOS) configured to prepost an application buffer to a front-end driver;
   a hypervisor; and
   a network interface card (NIC) configured to allocate a memory buffer for the guest operating system, to post the allocated memory buffer for the guest operating system to a receive queue, and to place received offloaded data packets into the memory buffer,
   wherein a back-end driver of the hypervisor is enabled to forward the memory buffer to a front-end driver associated with the guest operation system and the front-end driver is enabled to copy the received offloaded data packets from the memory buffer to the application buffer.

2. The system according to claim 1, wherein the network interface card places the received offloaded data packets into the memory buffer based on a MAC address associated with the received offloaded data packets.

3. The system according to claim 1, wherein the network interface card places the received offloaded data packets into the memory buffer based on a GOS identification parameter that identifies a particular guest operating system.

4. The system according to claim 1, wherein the network interface card is operable to place the received offloaded data packets into the memory buffer based on a network connection parameter associated with the received data packets.

5. The system according to claim 1, wherein the back-end driver is enabled to acknowledge the placement of the received offloaded data packets by the network interface card.

6. The system according to claim 1, wherein the network interface card places the received offload data packets into the memory buffer utilizing direct memory access.

7. The system according to claim 1, wherein the preposted application buffer are stored at the front-end driver without posting the preposted application buffer to the back-end driver.

8. The system according to claim 1, wherein the back-end driver limits a number of offloaded network connections based on a network connection parameter associated with the placed received data packets.

9. The system according to claim 8, wherein the offloaded network connections is one of a TCP/IP connection, RDMA connection, or an iSCSI connection.

10. A method for processing data comprising:
    preposting an application buffer from a guest operating system to a front-end driver;
    allocating, by a network interface card, a memory buffer for each guest operating system;
    posting the allocated memory buffer for the guest operating system to a receive queue;
    placing received offloaded data packets into the memory buffer; and
    copying, by the front-end driver, the received offloaded data packets from the memory buffer to the application buffer.

11. The method according to claim 10, wherein the received offloaded data packets are placed into the memory buffer based on a MAC address associated with the received offloaded data packets.

12. The method according to claim 10, wherein the received offloaded data packets are placed into the memory buffer based on a GOS identification parameter that identifies a particular guest operating system.

13. The method according to claim 10, wherein the received offloaded data packets are placed into the memory buffer based on a network connection parameter associated with the received data packets.

14. The method according to claim 10, further comprising acknowledging, via the back-end driver, the placement of the received offloaded data packets by the network interface card.

15. The method according to claim 10, wherein the received offload data packets are placed into the memory buffer utilizing direct memory access.

16. The method according to claim 10, further comprising storing the preposted application buffer at the front-end driver without posting the preposted application buffer to the back-end driver.

17. The method according to claim 10, further comprising limiting a number of offloaded network connections based on a network connection parameter associated with the placed received data packets.

18. The method according to claim 17, wherein the offloaded network connections is one of a TCP/IP connection, RDMA connection, or an iSCSI connection.

19. A method for processing data, the method comprising:
    receiving an acknowledgement that received data packets have been placed in one or more memory buffers corresponding to a particular guest operating system (GOS) by a network interface card (NIC); and
    responsive to receiving the acknowledgment, copying the one or more memory buffers to a preposted application buffer by a front-end driver.

20. The method of claim 19, further comprising preposting the application buffer to the front-end driver by the GOS.

* * * * *